(12) United States Patent
Cheruvu et al.

(10) Patent No.: US 11,870,562 B2
(45) Date of Patent: Jan. 9, 2024

(54) FUNCTION GENERATION IN NAMED FUNCTION NETWORKS

(71) Applicant: Intel Corporation, Santa Clara, CA (US)

(72) Inventors: Sunil Cheruvu, Tempe, AZ (US); Ned M. Smith, Beaverton, OR (US); Francesc Guim Bernat, Barcelona (ES); Kshitij Arun Doshi, Tempe, AZ (US); Eve M. Schooler, Portola Valley, CA (US); Dario Sabella, Munich (DE)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 17/131,615

(22) Filed: Dec. 22, 2020

(65) Prior Publication Data

US 2021/0152563 A1  May 20, 2021

Related U.S. Application Data

(60) Provisional application No. 63/011,749, filed on Apr. 17, 2020.

(51) Int. Cl.
| | |
|---|---|
| *H04L 9/40* | (2022.01) |
| *G06F 8/60* | (2018.01) |
| *H04L 45/00* | (2022.01) |
| *H04L 67/568* | (2022.01) |

(52) U.S. Cl.
CPC .............. *H04L 63/123* (2013.01); *G06F 8/60* (2013.01); *H04L 45/72* (2013.01); *H04L 63/08* (2013.01); *H04L 67/568* (2022.05)

(58) Field of Classification Search
CPC ..... H04L 63/123; H04L 63/08; H04L 67/568; H04L 45/72; G06F 8/60
USPC ............................................................ 726/3
See application file for complete search history.

(56) References Cited

U.S. PATENT DOCUMENTS

| | | | |
|---|---|---|---|
| 2013/0282756 A1* | 10/2013 | Kim ...................... | G06F 16/183 707/770 |
| 2014/0047383 A1* | 2/2014 | Sauer ...................... | G06F 9/451 715/764 |
| 2020/0259885 A1* | 8/2020 | Alam ...................... | G06F 9/5027 |

OTHER PUBLICATIONS

"ETSI GS MEC 026 V2.1.1", Multi-access Edge Computing (MEC); Support for regulatory requirements, (Jan. 2019), 18 pgs.

(Continued)

*Primary Examiner* — Michael S McNally
(74) *Attorney, Agent, or Firm* — Schwegman Lundberg & Woessner, P.A.

(57) ABSTRACT

A named function network (NFN) system includes a routing node, a function generation node, and a server node. The routing node receives requests for new functions, the requests including data values for generating the new functions. The function generation node receives the data values from the routing node and generates a new function for the NFN using the data values. The server node receives a request from the routing node to execute the new function, executes the new function, and transmits results of the execution to the routing node.

21 Claims, 6 Drawing Sheets

(56) References Cited

OTHER PUBLICATIONS

Abadi, Martin, "A Calculus for Access Control in Distributed Systems", ACM Transactions on Programming languages and Systems, vol. 15, No. 4, [Online]. Retrieved from the Internet: URL: https: www.researchgate.net publication 254829858, (Sep. 1993), 706-734.

Birkholz, H, "Concise Data Definition Language (CDDL): A Notational Convention to Express Concise Binary Object Representation (CBOR) and JSON Data Structures", Internet Engineering Task Force (IETF), (Jun. 2019), 64 pgs.

* cited by examiner

FUNCTION GENERATION IN NAMED FUNCTION NETWORKS

CLAIM OF PRIORITY

This application claims priority to U.S. Provisional Application Ser. No. 63/011,749, filed Apr. 17, 2020, which is hereby incorporated by reference herein in its entirety.

TECHNICAL FIELD

Embodiments described herein generally relate to security and processing techniques used with data communications and interconnected device networks, and in particular, to security and processing techniques applied within named function networks.

BACKGROUND

The examples disclosed herein may be implemented within the purview of information centric networking (ICN). ICN is an umbrella term for a new networking paradigm in which information and/or functions themselves are named and requested from the network instead of hosts (e.g., machines that provide information). To get content, for example, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices. A similar process may occur when a device requests the network perform a function.

Named function networking (NFN) extends the named data ICN paradigm to named function execution rather than traditional host-based approaches. Thus, a device may create an interest packet that names the function, and possible one or more parameters to the function. The interest is propagated as an ICN interest is propagated. When the interest arrives at a node that can and will execute the function, the execution is carried out, and a data packet with the results of the execution sent in return. As with traditional ICN, a result may be cached and returned in response to an interest if, for example, the function name and parameters match those that produce the cached result. NFN allows in-network resolution of expressions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In conventional NFN networks, users must know the name of the function to invoke the function on the network. If a user does not know the name of the function or whether the function possesses certain desirable properties, a directory may be used to associate function names with their properties.

In the following description, methods, configurations, and related apparatuses are disclosed for generating functions "on-the-fly" in named function networking (NFN) networks. In conventional NFN networks, if a user wants to change or improve a function, using other attributes, characteristics, or features found in other functions, a user is unable to accomplish the task. Examples disclosed herein permit a user to describe or otherwise define a function and then defer to the system/network to generate the function on-the-fly, including compositing (i.e., combining two or more parts for a function) where applicable.

Additionally, a property of trustworthiness may be added to functions and data for the NFN network. Other properties may also be included such as robustness, survivability, scalability, performance, and the like. The disclosed examples also include empowering automation of dynamic construction of new functions from existing functions (Dynamic Function Composition (DFC)). Doing so permits scale and flexibility in highly distributed networks with diverse capabilities, without any central loci, to empower and automate operations at scale, including cataloguing knowledge and mapping requests. DFC allows a user or a machine to realize this value based on traditional NFN operational semantics: i.e. matching a computational interest to existing computational capabilities that then are empowered to be reconstituted as new NFN functions. Automation of this capability may be facilitated by metadata and a function description language (FDL), for example.

The examples described herein provide significant advantages. For example, customers can deploy NFNs in an Edge FaaS infrastructure. Doing so allows new composite functions generated on-the-fly to aid for example machine learning/deep learning (ML/DL) deployments, with increased scalability because the automatic compositing of functions avoids hand configuration of such service chaining, as well as improved security and robustness due to attestation of both the data and the functions marshalled for execution. The examples disclosed herein provide attestation (and attestation provider/verifier) nodes that help ensure the integrity of NFN functions (code, script, executables, and the like).

Figure 1:
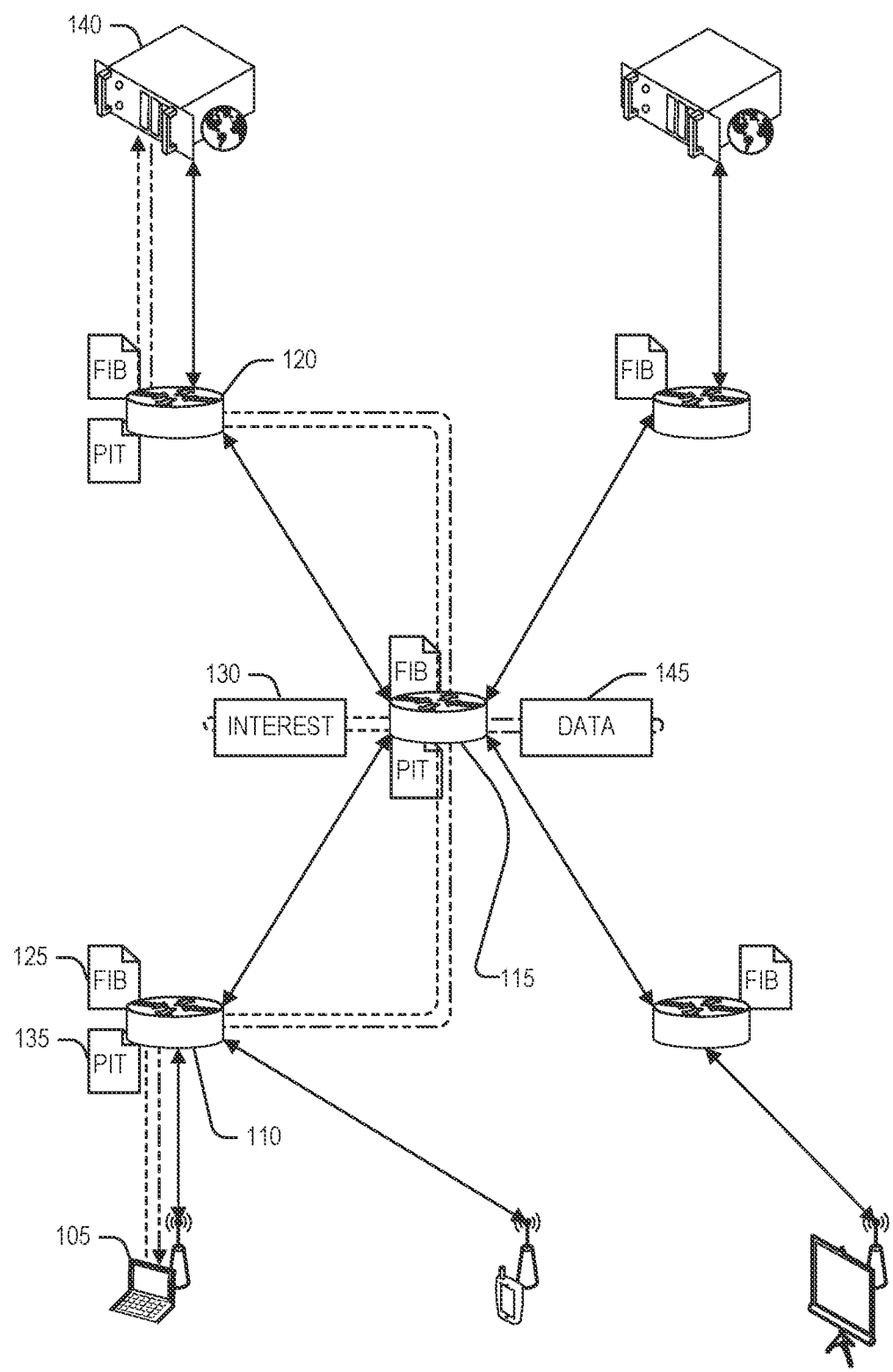
FIG. 1 illustrates an example ICN, according to an embodiment.

FIG. 1 illustrates an example ICN, according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 105 (e.g., subscriber) requests named content from the network itself. The content request may be called an interest and transmitted via an interest packet 130. As the interest packet traverses network devices (e.g., network elements, routers, switches, hubs, etc.)—such as network elements 110, 115, and 120—a record of the interest is kept, for example, in a pending interest table (PIT) at each network element. Thus, network element 110 maintains an entry in its PIT 135 for the interest packet 130, network element 115 maintains the entry in its PIT, and network element 120 maintains the entry in its PIT.

When a device, such as publisher 140, that has content matching the name in the interest packet 130 is encountered, that device 140 may send a data packet 145 in response to the interest packet 130. Typically, the data packet 145 is tracked back through the network to the source (e.g., device 105) by following the traces of the interest packet 130 left in the network element PITs. Thus, the PIT 135 at each network element establishes a trail back to the subscriber 105 for the data packet 145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 130 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 130 to data cached in the ICN element. Thus, for example, if the data 145 named in the interest 130 is cached in network element 115, then the network element 115 will return the data 145 to the subscriber 105 via the network element 110. However, if the data 145 is not cached at network element 115, the network element 115 routes the interest 130 on (e.g., to network element 120). To facilitate routing, the network elements may use a forwarding information base 125 (FIB) to match named data to an interface (e.g., physical port) for the route. Thus, the FIB 125 operates much like a routing table on a traditional network device.

In an example, additional meta-data may be attached to the interest packet 130, the cached data, or the route (e.g., in the FIB 125), to provide an additional level of matching. For example, the data name may be specified as "www.somedomain.com or videos or v8675309," but also include a version number—or timestamp, time range, endorsement, etc. In this example, the interest packet 130 may specify the desired name, the version number, or the version range. The matching may then locate routes or cached data matching the name and perform the additional comparison of meta-data or the like to arrive at an ultimate decision as to whether data or a route matches the interest packet 130 for respectively responding to the interest packet 130 with the data packet 145 or forwarding the interest packet 130.

ICN has advantages over host-based networking because the data segments are individually named. This enables aggressive caching throughout the network as a network element may provide a data packet 145 in response to an interest 130 as easily as an original author 140. Accordingly, it is less likely that the same segment of the network will transmit duplicates of the same data requested by different devices.

Fine grained encryption is another feature of many ICN networks. A typical data packet 145 includes a name for the data that matches the name in the interest packet 130. Further, the data packet 145 includes the requested data and may include additional information to filter similarly named data (e.g., by creation time, expiration time, version, etc.). To address malicious entities providing false information under the same name, the data packet 145 may also encrypt its contents with a publisher key or provide a cryptographic hash of the data and the name. Thus, knowing the key (e.g., from a certificate of an expected publisher 140) enables the recipient to ascertain whether the data is from that publisher 140. This technique also facilitates the aggressive caching of the data packets 145 throughout the network because each data packet 145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 2:
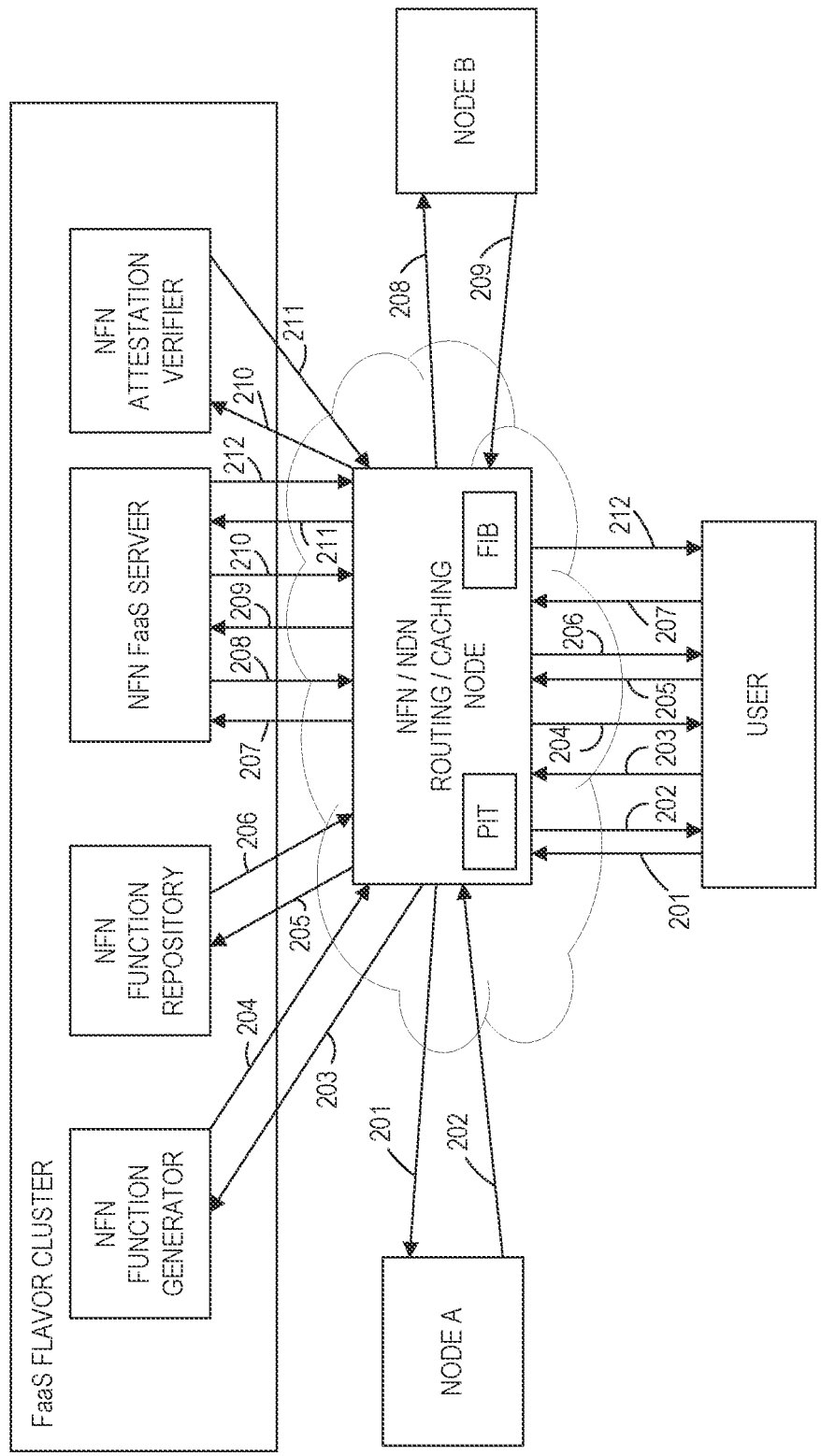
FIG. 2 is a diagram illustrating an example showing named function networking (NFN) generation and function attestation services integrated into a function-as-a-service (FaaS) flavor cluster in an NFN and named data networking (NDN) network.

FIG. 2 is a diagram illustrating an example workflow illustrating named function networking (NFN) function generation and function attestation services integrated into a function-as-a-service (FaaS) flavor cluster in an NFN and named data networking (NDN) network, such as the network illustrated in FIG. 1. An example workflow may be implemented in an Edge, IoT or Cloud services environment where an NDN/NFN abstraction is used to implement a workload. Two capabilities not currently associated with conventional NDN/NFN networks include: (1) the use of an NFN function generator service that accepts an abstract syntax definition of a workload that can be decomposed into simple functions consistent with Cloud and Edge FaaS architecture; and (2) automated instrumentation of device attestation into functions such that an attestation verifier is able to enforce a policy that ensures NDN data are consistently protected even though NDN/NFN networks place a layer of abstraction over the physical devices that make up the network.

In FIG. 2, a series of 'steps' are shown for an example workflow that represent a series of interest and data messages (e.g., packets) that may update PIT and FIB resources in a central routing node. For simplicity sake, only a single routing node is shown. The other satellite nodes represent endpoints that may either supply data or functions, or execute functions.

At operation 201, the Function Definition Language (FDL) for a function Fn( ) may be provisioned by a management process or a user. The management process or user may construct a function from an FDL. In this example, the user shows interest in $FDL_{Fna}$. Node A is an NDN node that knows $FDL_{Fna}$. This example combines an FDL for attestation ($FDL_{att}$) with an FDL for the function Fn (e.g. $FDL_{Fn}$) to produce a resulting attestation-aware FDL ($FDL_{Fna}$=combine ($FDL_{att}$, $FDL_{Fn}$)).

At operation 202, the $FDL_{Fna}$ is delivered to the user. At operation 203, the user requests a function generation interest for a function "Fn" supplying $FDL_{Fna}$ as an input value. The routing node forwards the interest packet to the NFN Function Generator node. At operation 204, the function generation contains/accepts an FDL and creates an NFN function. The function Fn( ) is returned to the user. At operation 205, the $FDL_{Fna}$ is input to the Function Generator and produces a function Fn( ). At operation 206, Fn( ) is added to the NFN Function Repository. Fn( ) may also be cached in the routing node's FIB.

At operation 207, the Function Repository and/or routing node return a directory entry for Fn( ) to the user satisfying the interest packet from operation 201. At operation 208, the user shows interest in executing a function named "Fn" using data values data1 and data2. The user sends "Fn", "data1", and "data2" to the routing node and the routing node forwards to an NFN FaaS server, which performs function execution plus localized orchestration. The FaaS server generates interest packets for the function input parameters data1 and data2. Interest in fn( ) is delivered to the routing node which may have the Fn( ) cached (operation 206). The function Fn( ) and data value interest is sent to the available NDN data repositories (e.g., Node B). Note that the FaaS server may have previously showed interest in executing "Fn" functions. Also note that if the FaaS flavor specializes in a class of function (e.g. AI, web search, graphics and media, financial etc.) the NDN/NFN interest packets may contain "class-of-function" names as part of the interest packet.

At operation 209: The FIB/function repository returns the function Fn( ) and Node B returns data1 and data2 to the routing node. The routing node may add data1 and data2 to its FIB. At operation 210, the FaaS server executes the fully formed function Fn(data1, data2). As part of Fn( ) execution, the attestation preamble executes which results in attestation evidence about the device hosting the FaaS server. Attestation evidence is supplied to the routing node which forwards the evidence to the attestation verifier. Note that the attestation verifier node may have previously registered interest in attestation evidence data. The PIT therefore contains a pending interest in attestation evidence.

At operation 211, the attestation verifier returns an attestation result. Upon receipt of attestation results, the pending PIT interest can be satisfied. The attestation result is then delivered to the FaaS server and/or the user nodes. The routing node's FIB is updated with attestation results. Note that the user may have registered interest in an attestation result as part of operation 205 or operation 207. Also note that the FaaS server may have registered interest in attestation results as part of operation 210.

At operation 212, the FaaS server node executes Fn(data1, data2). The FaaS server may have an attestation policy that requires the attestation result to be in the affirmative. In this example, the attestation result authorizes completion of the function. The function results are returned to user in response to the operation 205 interest. Note that in a different example, the user may show interest in an attestation result (operation 211) and evaluate the attestation result in concert with the function execution result (operation 212).

The user may still accept the function result but respond to it differently based on the attestation result.

Figure 3:
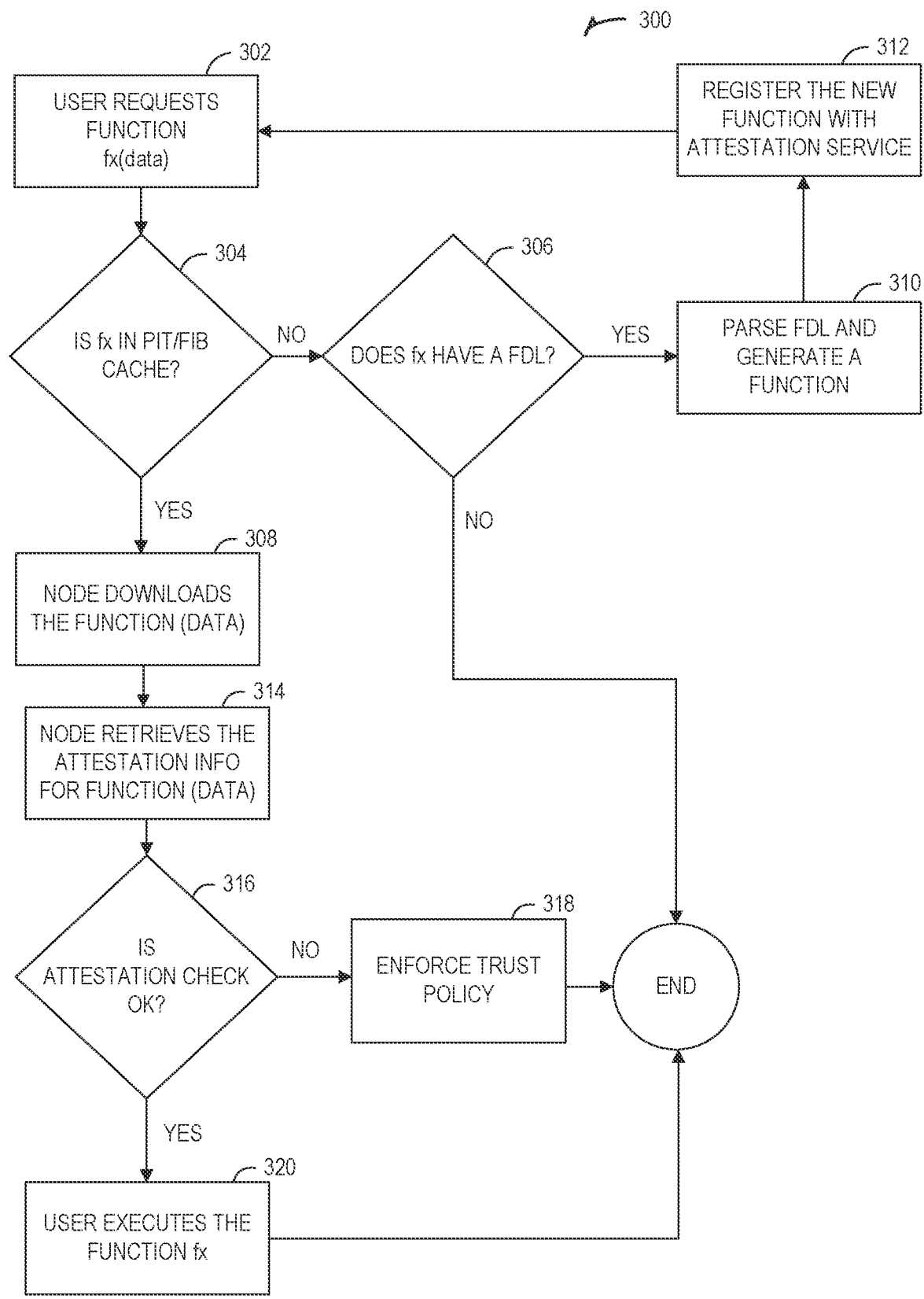
FIG. 3 is a flowchart illustrating a flow of function generation from attestation aware function definition language (FDL) to function execution involving runtime attestation check.

FIG. 3 is a flowchart illustrating a method 300 in which an NFN function is created from an FDL in order to satisfy an NFN interest request for executing the function. FIG. 3 further illustrates the instrumentation of the created function for attestation and performance of an attestation check as part of an NFN function execution workload. For the example illustrated in FIG. 3, the attestation of data and functions are transparent to the user in an NFN network.

Benefits that are a result of such transparency include that edge data flows can be aligned with different attestation, security, and privacy regulations across geographic and institutional boundaries, without complicating the operational logic of the user defined functions (expressed as in case of FDL1 above). For example, government laws and mandates from various nations may be enforced within NFNs and attestation service engines in a distributed and adaptive manner, without encumbering function and data expressions that are orthogonal to such requirements. Similarly, logging and auditing mandates of different principals and principalities can be accommodated transparently.

The attestation and trust calculus components of the examples disclosed herein may also include third party commitments with respect to data privacy and security. Thus, for example, a commitment that a principal shall enforce digital rights management (DRM) (duly assured by a controlling clause) ensures protection from theft of content and service by non-compliant parties.

Further, the attestation and delegation of security responsibilities described above apply to caching and storage of contents and to execution and storage of results at the NFN intermediaries in an edge FaaS network according to the examples disclosed herein. Note that execution of an Edge SLA/Workloads may utilize distributed orchestration where the control over orchestration is distributed across the various NFN participants. Orchestration control may be scripted using a Function Definition Language (FDL) to choreograph a set of functions over a set of entities including NFN participants.

Figure 4:
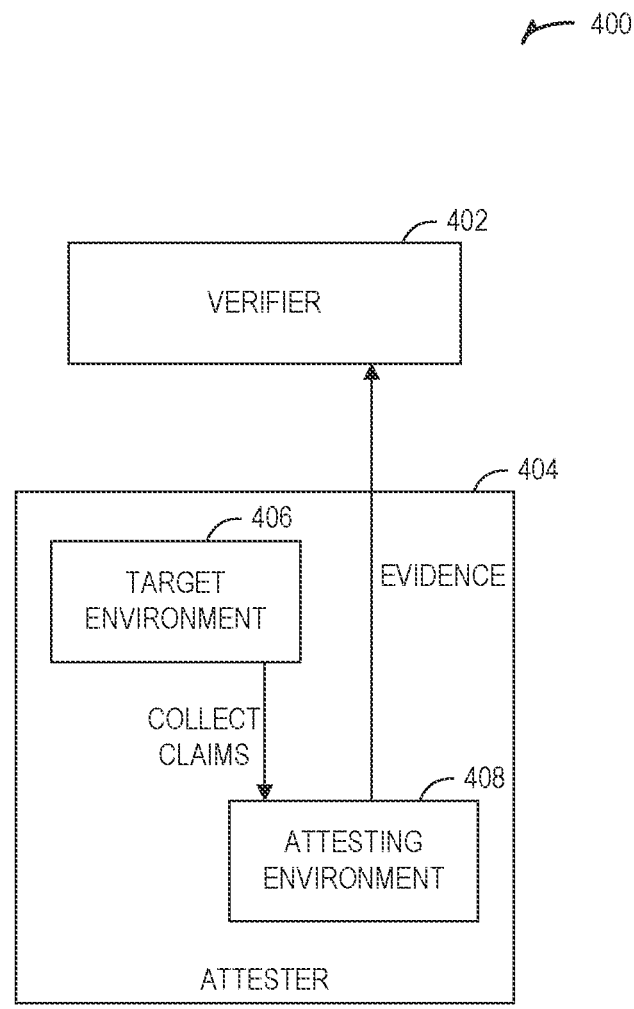
FIG. 4 is a diagram illustrating an attester that includes two environments.

At step 302, a user requests a new function. At step 304, a routing or other node in the NFN network determines if the function is present in the PIT/FIB cache. If the function is not present in the cache, method 300 proceeds to step 306, and if the function is present in the cache, method 300 proceeds to step 308. At step 306, the routing or other node determines if the function has an FDL. If the function has an FDL, method 300 proceeds to step 310 and if not, method 300 ends. At step 310, the FDL is parsed to generate a function according to the FDL. At step 312, the new function is registered with an attestation service, such as is shown in FIG. 4. Following step 312, the method 300 returns to step 302 and the user once again requests the function.

At step 308, the requesting node downloads the function. At step 314, the node retrieves the attestation information for the function and checks the attestation information at step 316. If the attestation information is not okay, the method 300 proceeds to step 318, enforces a trust policy, and ends. If the attestation information is okay, the method 300 proceeds to step 320, executes the function, and ends.

FIG. 4 is a diagram illustrating an environment 400 that includes a verifier 402 and an attester 404. The attester 404 includes a target environment 406 and an attesting environment 408. A function generator and function verifier 402 share a common understanding of the attesting environment 408 and the target environment 406. The attesting environment 408 collects attestation claims about the target. Claims collection requires the attesting environment 408 to prescriptively 'walk' the target environment 406. For example, the attesting environment 408 may visit a sequence of memory pages or read an executable file format such as common object file format (COFF)/executable link format (ELF). The 'walking' algorithm is shared by the attestation verifier 402 in order for the verifier 402 to validate reference measurements describing the target environment 406.

In an example, an attestation statement 't' is defined that is a statement about trust. The function generator uses 't' to describe the statements that may contribute to a message digest used to create identifiers. These values are also used to generate an attestation key or key pair. The function generator then becomes a supplier of 't' to the NDN. The function verifier 402 shows interest in 't' by one of its names. When the function verifier 402 receives an attestation event from the FaaS server (FIG. 2—step 210), the function verifier 402 uses 't' to direct verification steps. The verifier 402 is able to precisely compute the digest because 't' is unambiguous and is used by both the FaaS Server and by the function verifier 402 to compute the reference digest that is used to compare to the evidence.

Function Definition Language Details

A function definition language (FDL) may be constructed from existing data modeling languages (DML), for example. This approach leverages existing developer tools and technology.

In some examples, DMLs describe RESTful function call semantics using a data modeling language. For example, given an available endpoint (/users) and operations on each endpoint (GET/users, POST/users), the DML key words "GET" and "POST" describe simple REST request response behaviors. The examples disclosed herein extend the REST semantics for NFN to include named function execution, rather than implying function execution by modeling only data exchange.

Below is an example FDL pipeline that integrates attestation. An FDL script may be used to support execution of NFN functions. For example, a function interface definition may look like the following:

GET Attestation Evidence as <aev1> for <data1> from <location1>//e.g., NDN source
GET Attestation Evidence as <aev2> for <data2> from <location2>
GET Attestation Evidence as <aev3> for <Preprocess( )> from <location3>//e.g. NFN source
GET Attestation Evidence as <aev4> for <Monte-Carlo( )> from <location4>//e.g. NFN source
RUN Preprocess(aev1, aev3, data1) at <location5>|
    Preprocess(aev2, aev3, data2) at <location5>|
    Monte-Carlo(aev4) at <location5>; //where the cleaned and attested data1 and data2 are inputs to Monte-Carlo Note that the "RUN" key word orchestrates the three function invocations and "|" connects function outputs to function inputs. The functions Preprocess( ) and Monte-Carlo( ) implement attestation verifiers. Attestation results are evaluated prior to performing data sanitation and Monte-Carlo analysis. Also note that the location where the function (NFN) resides may differ from the location where it is executed. Therefore, the attestation evidence is given to the function at its intended execution location.

Also note that the specification of 'location' differs from conventional NDN/NFN behavior, but the FDL introduces the logical abstraction to comprehend attestation semantics, namely the need to associate a resource (file, function) with a trustworthy environment.

Also note this abstraction allows for greater efficiency and optimization of the placement of certain operations and resources, which is beneficial for not only attestation, but energy efficiency, orchestration performance, and the like.

Also note that <location> is a name that becomes associated with the NDN/NFN node where the data or function is ultimately found. It may be used to associate the attestation properties of the physical device that holds the data or function named by the above interface definition FDL.

Function/Data Attestation Method:

A known calculus may be extended for Edge/MEC to describe trust and transitive trust relationships that occur in the context of orchestrated multi-tenant isolated environments. In AB5598 a Trust Level Agreement (TLA) is used to manage trust. A TLA may include trust expressions using the calculus. Security controllers, orchestrators and other nodes may use the calculus to analyze trust exposure, compute overlapping trust semantics and apply an enforcement, logging or other response to trust computations based on the calculus. A representation of the calculus using popular data definition languages such as JSON, JWT, CWT may be used for machine automation that parses, interprets and integrity/confidentiality protects it.

NFN Function Generator

The NFN function generator (FIG. 2) may rely on a function calculus to generate functions dynamically. Generation of attestation logic is integrated into existing functions or may be part of generalized function generation solution that accepts as input a function definition and produces an NFN function as output. A known calculus is shown below and is extended to support NDN/NFN attestation function generation.

Trust Calculus Primitives

Trust calculus primitives are a postfix equation where the prefix to the operation is a Principal (actor) and the suffix is the Object that results from applying the operation. The primitives below are expressed as <prefix><operation><suffix> format. Uppercase elements are Principals, lower case elements are operators and lowercase bold elements are Objects.

A says s: A makes the statement s. Corresponds to digital signature.

A controls s: A is trusted on s: if A says s then s is extant. This is the meaning of A appearing in the ACL for s.

A joins B: A is a stronger principal than B. (For example, when B represents a group, A may represent a member or a subgroup of B.) If A says s then B says s, and if B controls s then A controls s. Corresponds to group formation. K joins B corresponds to key generation.

A equals B: A joins B and B joins A.

B serves A: B is a delegate for A. This can be defined as (((B quotes A) joins B) for A).

A union B: A and B in conjunction; (A union B) says s if and only if A says s and B says s.

B quotes A: B quoting A; (B quotes A) says s if and only if B says A says s.

B for A: B on behalf of A. This can be defined in terms of a fictional delegation server D, as (B union D) IA. If B says A says s and B serves A then (B for A) says s.

A as R: A in role R. This can be encoded as A quotes R.

A intersect B: the intersection of A and B, if A and B are atomic symbols.

A minus B (e.g. A−B): A minus B, if A and B are atomic symbols.

A sub B: A is substituted for B; if A then B. Can be used to define variables.

Attestation Modelling

Attestation semantics may be defined using the trust calculus by assigning attestation roles to principals of the trust calculus.

Trust relationships can be expressed using the trust calculus:

V controls (C union t): mfg. produces a reference assertion t.

(K joins V) controls (C union t): mfg. produces a verifiable reference assertion t.

P sub ((K joins V) controls (C union t)): A policy P is formed from a verifiable reference.

(K joins A) says (C union t): Attestation of t given C.

Note: verifier must check that a trusted P contains a (C union t) that matches the attested (C union t).

K joins (C union t); DICE key generation; K joins ((C1 union C2) union t); DICE layered key generation.

$K_D$ sub (K joins (C union t)); A DICE key instance.

(C3 joins C1) joins C0; A DICE layering sequence using a sequence of components.

Terms

A=Attester Principal (aka Attesting Environment)
V=Vendor Principal
C=Component Principal (aka Target Environment)
K=Key Principal
P=Policy Principal
R=Role Principal
s=statementObject
t=trustworthiness statement or "claim" Object
Note: Principals may double as Objects A representation of an attestation expression using a data definition language can be fed into a trust verification engine, such as the NFN attestation verifier in FIG. 2

Additionally, a trust expression analyzer may be used to identify possible insecure logic or untrusted states in the attestation model. Note that Edge orchestration can be modelled similarly using a trust modeling calculus with appropriate extensions for orchestration roles. Orchestration modelling is partially achieved using the above FDL and calculus. In some examples, other aspects of orchestration could be extended. The calculus and FDL are inherently extensible.

Also note that principals may be a composition of other principals. For example, a platform may include multiple components (e.g. NIC, FPGA, Core(s), Memory). Each component may have a root of trust that can attest the respective component. One of the components may attest to a cloud service on behalf of the other components. The 'join' primitive may be used to describe this relationship by representing a group of principals as a principal. The group may include a collection of sub-components that form an acyclic graph. For example, a simple tree structure might have a root node C0, a first and second layer 2 nodes C1 and C2 and a fourth, fifth, sixth and seventh nodes at layer 2: e.g. C3, C4, C5 and C6:

C0→C1→C3
　　→C4
　→C2→C5
　　→C6
. . . etc.

The path from root to leaf may be a component identity that is a three-tuple of (C0→C1→C3). Compositions of Principals can be described using the above calculus by using join to show nested groupings. E.g. (C3 joins C1) joins C0. Note that the join operation is used instead of union because union conflates the tree into a single object.

Attestation Function Modelling

The trust calculus may be modified to allow meta-language expressions that natively describe attestation function semantics.

The following operator definitions map to functions and may be used in a CDDL to allow type enforced function expressions.

One of the function expressions is ".joins" (see Table 1), which is used to describe the creation of groups of resources or principals.

For example:

My-group=((A·joins B),t)

This expression creates the group My-group using a group membership equation based on the .joins operator. The .joins operator may map to a cryptographic mechanism such as a using bilinear maps over elliptic curve groups (i.e. EPID) or may inform an orchestrator that a cryptographic group membership method must be applied in order to realize the My-group data structure. It may also assert that A, B and t are well-formed principals having trust semantics according to the grammar.

TABLE 1

Listing of possible operations used by attestation functions.

| # | Name | Description |
|---|------|-------------|
| 1 | .says | A makes the statement s. Corresponds to digital signature. |
| 2 | .controls | A is trusted on s: if A says s then s is extant. This is the meaning of A appearing in the ACL for s. |
| 3 | .joins | A is a stronger principal than B. (For example, when B represents a group, A may represent a member or a subgroup of B.) If A says s then B says s, and if B controls s then A controls s. Corresponds to group formation. K joins B corresponds to key generation. |
| 4 | .equals | A joins B and B joins A. |
| 5 | .serves | B is a delegate for A. This can be defined as (((B quotes A) joins B) for A). |
| 6 | .union | A and B in conjunction; (A union B) says s if and only if A says s and B says s. |
| 7 | .quotes | (B quotes A) says s if and only if B says A says s. |
| 8 | .for | B on behalf of A. This can be defined in terms of a fictional delegation server D, as (B union D) IA. If B says A says s and B serves A then (B for A) says s. |
| 9 | .as | A in the role of R. This can be encoded as A quotes R. |
| 10 | .intersect | the intersection of A and B, if A and B are atomic expressions of principal groups. |
| 11 | .minus | A minus B subtracts B from A if A and B are atomic expressions of principal groups. |
| 12 | .sub | A is substituted for B; if A then B. Can be used to define variables |

Examples disclosed herein claim that, because there is a machine-readable data definition (CDDL) of the calculus and because the calculus can describe attestation and trust semantics, the various edge ecosystem stakeholders are able to dynamically generate function with attestation semantics and can evaluate trust (not just attributes aka tag-values). This is important when considering scenarios where workloads are to be distributed among several possible hosting environments each having different trustworthiness properties. A trust orchestrator may need to evaluate a distributed execution plan trustworthiness as a pre-condition of scheduling the workload. Scheduling and trust evaluation may be iterative or recursive where the objective of evaluation is to optimize for both trust and performance. Trustworthiness may not be easily mapped to a scalar range (e.g. high, medium, low) but rather may be dynamic according to known vulnerabilities, known patches and product innovations that are incorporated into edge infrastructure following various product deployment lifecycles.

ADDITIONAL CONSIDERATIONS

The attestation verifier responds to FDL instructions supplied by an NFN routing node or other trusted node(s) to augment FDL with attestation pre-requisite flows/checks. Use of FDL to describe Edge workloads enables dynamic augmentation of user supplied (and potentially insecure FDL expressions) with security validated FDL expressions. For example, a user FDL may invoke an FaaS Function F1 that is interpreted (but not executed) by an NFN Node to determine if F1 has been attested. If not, it may augment a user-supplied, potentially insecure FDL expression, such as FDL1, with instructions to perform attestation to produce a changed FDL expression, namely FDL1'. Instead of FDL1, it is FDL1 that is executed, which achieves FDL1 execution securely.

The examples disclosed herein describe how a Concise Data Definition Language may be modified to become a Function Definition Language. Thus, the examples disclosed herein deliver flexibility to apply these security and compositing dynamics efficiently and securely by capitalizing on the use of the FDL.

The NFN node retrieves the data and function from the corresponding providers and retrieves the attestation results. If the function is described as a DML, the DML is parsed and the function is generated on the fly (aka compositing). Then, a virtuous cycle for further compositing operations is enabled by registering the new functions with the attestation server.

Known trust calculi can be extended to become a calculus for evaluating trust in addition to access. There is potential opportunity in automation use cases.

Resources that exceed a threshold may have access control consequences. Otherwise, there may be a different enforcement consequence. (Allow, deny, sandbox-allow, . . . etc.)

The examples described herein may apply to car makers in 5GAA, for example, which may desire a framework for the definition of trust and data access control, as the car makers may use MEC for V2X services. In some examples, this may be implemented as a JSON data format and exposed, for example, through RESTful API.

In some of the examples disclosed herein, the verifier 402 may use a reference integrity manifest (RIM) structure to validate the claims against evidence. In an example, the NFN/NDN networks may include a distributed trusted computing base (TCB) architecture that utilizes device identifier composition engine (DICE) layering. Each TCB component's evidence may be part of a certificate, which may be dynamically generated by a DICE layer n−1. Certificates may contain both evidence and endorsement extensions. If a verifier has network access, endorsement extensions can be a uniform resource identifier (URI) to the corresponding endorsement for a specific TCB. In some cases, certificate path validation may be overloaded with evidence appraisals and thus, the layer n−1 TCB may need to know which approach the verifier prefers for obtaining endorsements. This approach may be negotiated prior to DICE certificates being issued.

Figure 5:
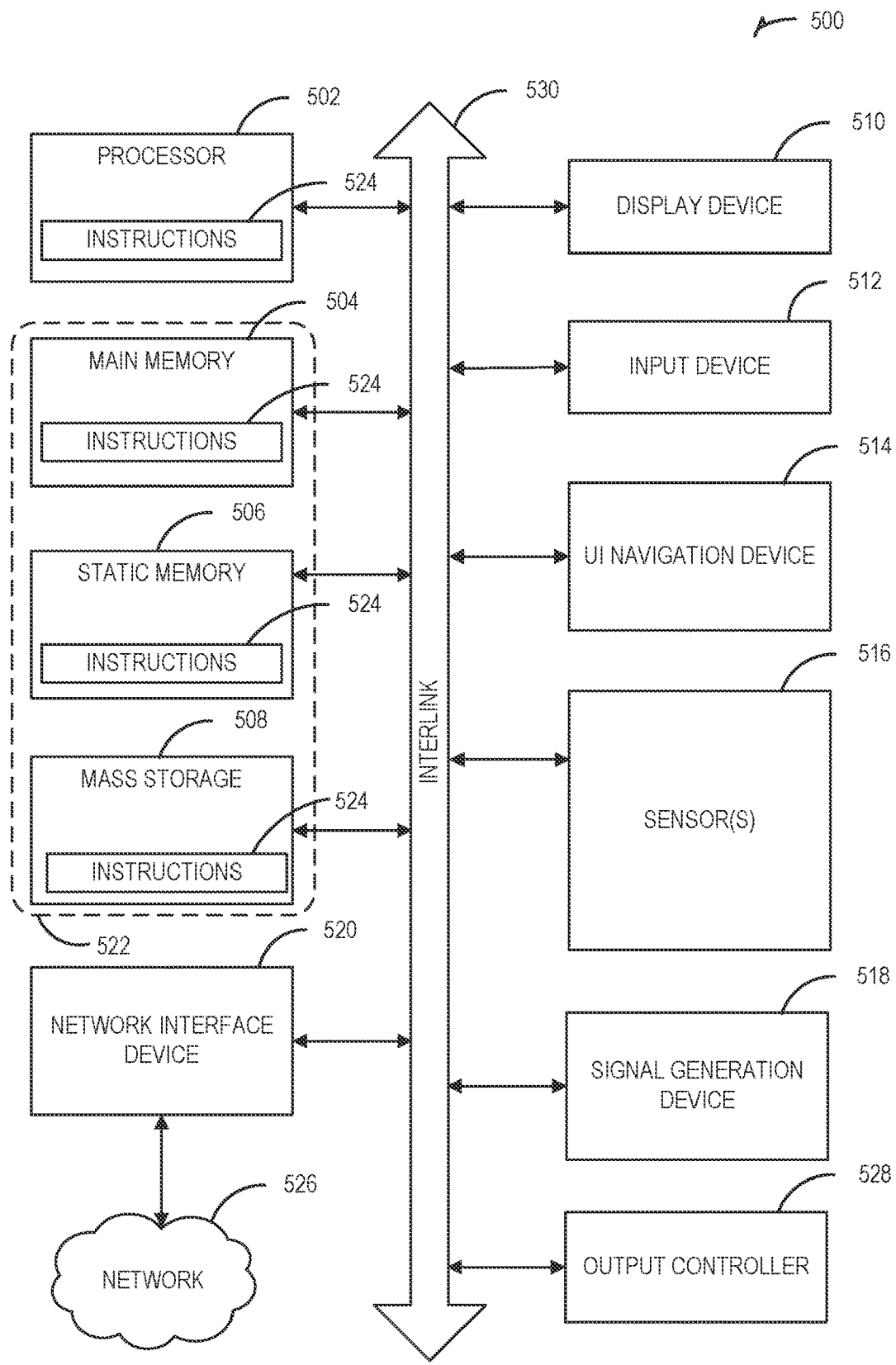
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

Figure 6:
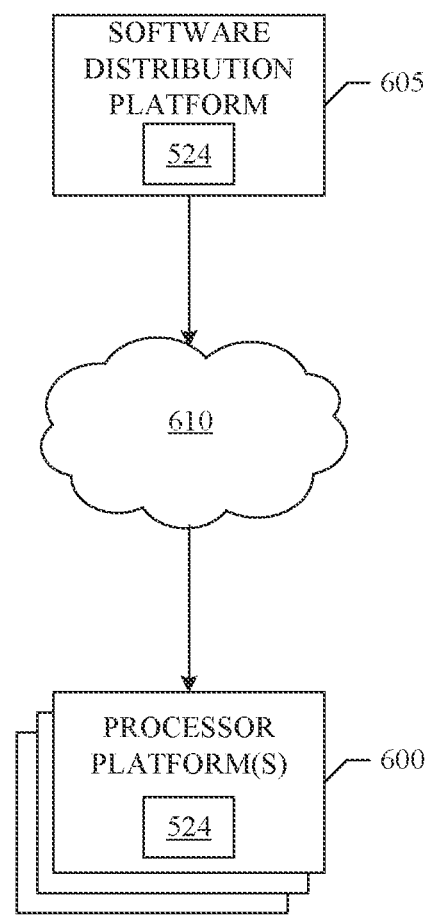
FIG. 6 is a diagram illustrating an example software distribution platform to distribute software to one or more devices.

FIG. 6 illustrates an example software distribution platform 605 to distribute software, such as the example computer readable instructions 524 of FIG. 5, to one or more devices, such as example processor platform(s) 600 and/or example connected edge devices. The example software distribution platform 605 may be implemented by any computer server, data facility, cloud service, etc., capable of storing and transmitting software to other computing devices (e.g., third parties, the example connected edge devices 105 of FIG. 1). Example connected edge devices may be customers, clients, managing devices (e.g., servers), third parties (e.g., customers of an entity owning and/or operating the software distribution platform 605). Example connected edge devices may operate in commercial and/or home automation environments. In some examples, a third party is a developer, a seller, and/or a licensor of software such as the example computer readable instructions 524 of FIG. 5. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 6, the software distribution platform 605 includes one or more servers and one or more storage devices. The storage devices store the computer readable instructions 524, which may correspond to the example computer readable instructions 524 of FIG. 5 as described above. The one or more servers of the example software distribution platform 605 are in communication with a network 610, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 524 from the software distribution platform 605. For example, the software, which may correspond to the example computer readable instructions 524 of FIG. 5, may be downloaded to the example processor platform(s) 600 (e.g., example connected edge devices), which is/are to execute the computer readable instructions 524 to implement the named function network function generation described herein. In some examples, one or more servers of the software distribution platform 605 are communicatively connected to one or more security domains and/or security devices through which requests and transmissions of the example computer readable instructions 524 must pass. In some examples, one or more servers of the software distribution platform 605 periodically offer, transmit, and/or force updates to the software (e.g., the example computer readable instructions 524 of FIG. 5) to ensure improvements, patches, updates, etc. are distributed and applied to the software at the end user devices.

In the illustrated example of FIG. 6, the computer readable instructions 524 are stored on storage devices of the software distribution platform 605 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 524 stored in the software distribution platform 605 are in a first format when transmitted to the example processor platform(s) 600. In some examples, the first format is an executable binary in which particular types of the processor platform(s) 600 can execute. However, in some examples, the first format is uncompiled code that requires one or more preparation tasks to transform the first format to a second format to enable execution on the example processor platform(s) 600. For instance, the receiving processor platform(s) 600 may need to compile the computer readable instructions 524 in the first format to generate executable code in a second format that is capable of being executed on the processor platform(s) 600. In still other examples, the first format is interpreted code that, upon reaching the processor platform(s) 600, is interpreted by an interpreter to facilitate execution of instructions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a named function network (NFN) system comprising: a routing node that receives an interest packet that includes, a request for a new function, the requests including data values for generating the new function; a function generation node that receives the data values from the routing node and generates the new function for the NFN using the data values; and a server node configured to: receive a request from the routing node to execute the new function; execute the new function: and transmit a data packet that includes results of the execution to the routing node.

In Example 2, the subject matter of Example 1 includes, wherein the data values are formatted in a function definition language interpretable by the function generation node to generate functions for the NFN.

In Example 3, the subject matter of Examples 1-2 includes, an attestation verifier that generates attestation information for new functions and receives inquiries for the new function to authenticate the new function for the NFN.

In Example 4, the subject matter of Example 3 includes, wherein the routing node downloads the attestation information for the new function and provides the attestation information to a node that requests the new function to verify the new function for the node.

In Example 5, the subject matter of Example 4 includes, wherein the routing node stores the attestation information in a forward information base of the routing node.

In Example 6, the subject matter of Examples 1-5 includes, wherein the routing node comprises a cache configured to store generated functions, and wherein the routing node checks the cache upon receipt of the interest packet for executing the new function.

In Example 7, the subject matter of Examples 1-6 includes, a function repository that receives and stores the generated function.

Example 8 is a routing node of a named function network (NFN), the routing node comprising: one or more hardware processors; and a memory, storing instructions, which when executed, cause the one or more hardware processors to perform operations comprising: receiving a first interest packet that includes, a request to generate a function using data values; forwarding the data values to a named function generator to generate a new function for the NFN; receiving a reference to the new function from the named function generator; receiving a second interest packet that includes request to execute the new function from a node; forwarding the request to a named function server for execution of the new function; receiving results of the execution of the new function from the named function server in a data packet; and forwarding the results of the execution to the node.

In Example 9, the subject matter of Example 8 includes, wherein the data values are formatted in a function definition language interpretable by the function generation node to generate functions for the NFN.

In Example 10, the subject matter of Examples 8-9 includes, operations of transmitting an inquiry for attestation information to an attestation verifier that generates the attestation information for new functions to authenticate the new function for the NFN.

In Example 11, the subject matter of Example 10 includes, operations of downloading the attestation information for the new function and providing the attestation information to a node that requests the new function to verify the new function for the node.

In Example 12, the subject matter of Example 11 includes, operations of storing the attestation information in a forward information base.

In Example 13, the subject matter of Examples 8-12 includes, operations of storing generated functions in a cache, and checking the cache upon receipt of an interest for executing the new function.

In Example 14, the subject matter of Examples 8-13 includes, wherein receiving results of the execution of the new function from the named function server comprises storing the new function in a cache of the routing node.

Example 15 is a non-transitory machine-readable medium including instructions that, when executed by a routing node of a named function network (NFN), cause the routing node to perform operations comprising: receiving a first interest packet that includes, a request to generate a function using data values; forwarding the data values to a named function generator to generate a new function for the NFN; receiving a reference to the new function from the named function generator, receiving a second interest packet that includes a request to execute the new function from a node; forwarding the request to a named function server for execution of the new function; receiving results of the execution of the new function from the named function server in a data packet; and forwarding the results of the execution to the node.

In Example 16, the subject matter of Example 15 includes, wherein the data values are formatted in a function definition language interpretable by the function generation node to generate functions for the NFN.

In Example 17, the subject matter of Examples 15-16 includes, operations of transmitting an inquiry for attestation information to an attestation verifier that generates the attestation information for new functions to authenticate the new function for the NFN.

In Example 18, the subject matter of Example 17 includes, operations of downloading the attestation information for the new function and providing the attestation information to a node that requests the new function to verify the new function for the node.

In Example 19, the subject matter of Example 18 includes, operations of storing the attestation information in a forward information base.

In Example 20, the subject matter of Examples 15-19 includes, operations of storing generated functions in a cache, and checking the cache upon receipt of an interest for executing the new function.

In Example 21, the subject matter of Examples 15-20 includes, wherein receiving results of the execution of the new function from the named function server comprises storing the new function in a cache of the routing node.

In Example 22 is a routing node comprising: means for receiving a request to generate a function using data values; means for forwarding the data values to a named function generator to generate a new function for a named function network (NFN); means for receiving a reference to the new function from the named function generator; means for receiving a request to execute the new function from a node; means for forwarding the request to a named function server for execution of the new function; means for receiving results of the execution of the new function from the named function server; and means for forwarding the results of the execution to the node.

In Example 23, the subject matter of Example 22 includes, wherein the data values are formatted in a function definition language interpretable by the function generation node to generate functions for the NFN.

In Example 24, the subject matter of Examples 22-23 includes, means for transmitting an inquiry for attestation information to an attestation verifier that generates the attestation information for new functions to authenticate the new function for the NFN.

In Example 25, the subject matter of Example 24 includes, means for downloading the attestation information for the new function and providing the attestation information to a node that requests the new function to verify the new function for the node.

In Example 26, the subject matter of Example 25 includes, means for storing the attestation information in a forward information base.

In Example 27, the subject matter of Examples 22-26 includes, means for storing generated functions in a cache, and checking the cache upon receipt of an interest for executing the new function.

In Example 28, the subject matter of Examples 22-27 includes, wherein the means for receiving results of the execution of the new function from the named function server comprises means for storing the new function in a cache of the routing node.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A named function network (NFN) system comprising:
a routing node that receives an interest packet that includes a request for a new function, the requests including data values for generating the new function;
a function generation node that receives the data values from the routing node and generates the new function for the NFN using the data values; and
a server node configured to:
receive a request from the routing node to execute the new function;
execute the new function; and
transmit a data packet that includes results of the execution to the routing node.

2. The system of claim 1, wherein the data values are formatted in a function definition language interpretable by the function generation node to generate functions for the NFN.

3. The system of claim 1, further comprising:
an attestation verifier that generates attestation information for new functions and receives inquiries for the new function to authenticate the new function for the NFN.

4. The system of claim 3, wherein the routing node downloads the attestation information for the new function and provides the attestation information to a node that requests the new function to verify the new function for the node.

5. The system of claim 4, wherein the routing node stores the attestation information in a forward information base of the routing node.

6. The system of claim 1, wherein the routing node comprises a cache configured to store generated functions, and wherein the routing node checks the cache upon receipt of the interest packet for executing the new function.

7. The system of claim 1, further comprising a function repository that receives and stores the generated function.

8. A routing node of a named function network (NFN), the routing node comprising:
one or more hardware processors; and
a memory, storing instructions, which when executed, cause the one or more hardware processors to perform operations comprising:
receiving a first interest packet that includes a request to generate a function using data values;
forwarding the data values to a named function generator to generate a new function for the NFN;
receiving a reference to the new function from the named function generator;
receiving a second interest packet that includes request to execute the new function from a node;
forwarding the request to a named function server for execution of the new function;
receiving results of the execution of the new function from the named function server in a data packet; and
forwarding the results of the execution to the node.

9. The routing node of claim 8, wherein the data values are formatted in a function definition language interpretable by the function generation node to generate functions for the NFN.

10. The routing node of claim 8, further comprising operations of transmitting an inquiry for attestation information to an attestation verifier that generates the attestation information for new functions to authenticate the new function for the NFN.

11. The routing node of claim 10, further comprising operations of downloading the attestation information for the new function and providing the attestation information to a node that requests the new function to verify the new function for the node.

12. The routing node of claim 11, further comprising operations of storing the attestation information in a forward information base.

13. The routing node of claim 8, further comprising operations of storing generated functions in a cache, and checking the cache upon receipt of an interest for executing the new function.

14. The routing node of claim 8, wherein receiving results of the execution of the new function from the named function server comprises storing the new function in a cache of the routing node.

15. A non-transitory machine-readable medium including instructions that, when executed by a routing node of a named function network (NFN), cause the routing node to perform operations comprising:
receiving a first interest packet that includes a request to generate a function using data values;
forwarding the data values to a named function generator to generate a new function for the NFN;
receiving a reference to the new function from the named function generator;
receiving a second interest packet that includes a request to execute the new function from a node;
forwarding the request to a named function server for execution of the new function;
receiving results of the execution of the new function from the named function server in a data packet; and
forwarding the results of the execution to the node.

16. The non-transitory machine-readable medium of claim 15, wherein the data values are formatted in a function definition language interpretable by the function generation node to generate functions for the NFN.

17. The non-transitory machine-readable medium of claim 15, further comprising operations of transmitting an inquiry for attestation information to an attestation verifier that generates the attestation information for new functions to authenticate the new function for the NFN.

18. The non-transitory machine-readable medium of claim 17, further comprising operations of downloading the attestation information for the new function and providing the attestation information to a node that requests the new function to verify the new function for the node.

19. The non-transitory machine-readable medium of claim 18, further comprising operations of storing the attestation information in a forward information base.

20. The non-transitory machine-readable medium of claim 15, further comprising operations of storing generated functions in a cache, and checking the cache upon receipt of an interest for executing the new function.

21. The non-transitory machine-readable medium of claim 15, wherein receiving results of the execution of the new function from the named function server comprises storing the new function in a cache of the routing node.

* * * * *